May 17, 1938. W. H. FRANK ET AL 2,117,307
ELECTRICAL DISTRIBUTION SYSTEM
Original Filed Jan. 29, 1936
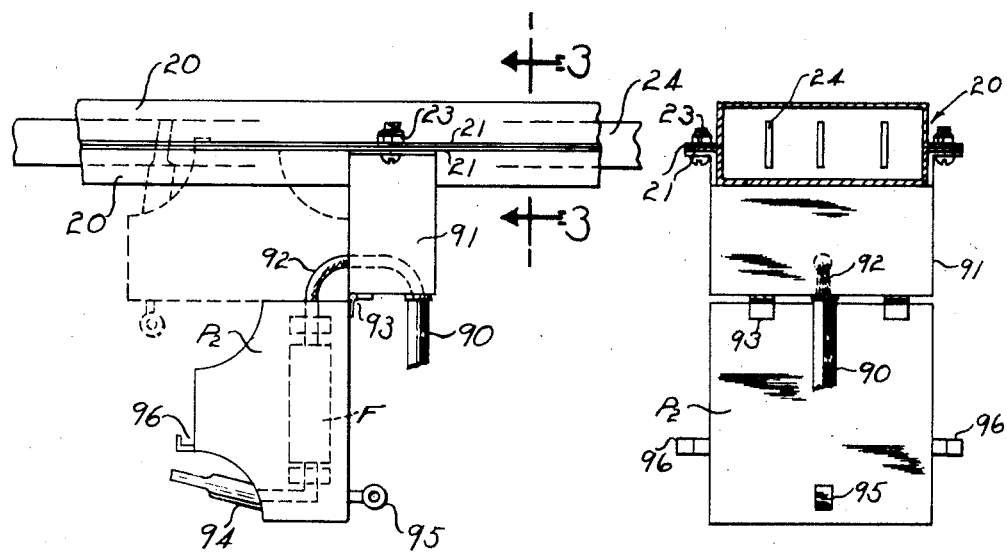
Fig. 1
Fig. 3
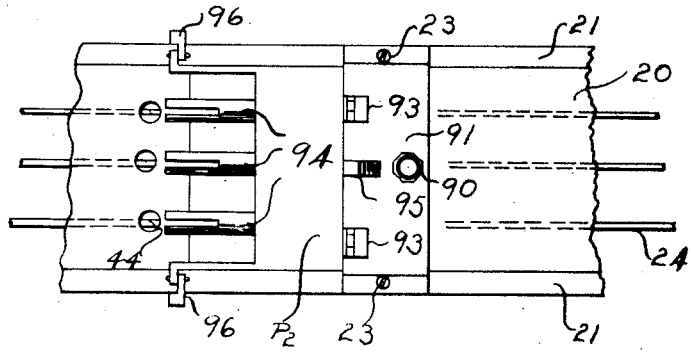
Fig. 2
INVENTORS
William H. Frank
BY Joseph W. Harper
Daniel J. Cullen ATTORNEY.

Patented May 17, 1938

2,117,307

UNITED STATES PATENT OFFICE 2,117,307

ELECTRICAL DISTRIBUTION SYSTEM

William H. Frank and Joseph W. Harper, Detroit, Mich.

Original application January 29, 1936, Serial No. 61,290. Divided and this application August 6, 1937, Serial No. 157,670

4 Claims. (Cl. 247—3)

This application relates to electrical distribution systems of the character shown in our Patent No. 2,041,675 of May 19, 1936 and in our application Serial No. 61,290 of January 29, 1936. It will be understood that the aforesaid application is a division of the aforesaid patent application and that the instant application is a division of the aforesaid pending application.

More particularly, this application relates to a novel form of branch outlet device including a swinging plug, which form is shown at P2 in Figs. 1 and 2 of the drawing originally filed in the Patent Office in the aforesaid patent and application.

For an understanding of the details of construction of the branch outlet device hereof, reference will be had to the appended drawing. In this drawing, Fig. 1 is a side view of a duct having the branch outlet device hereof mounted thereon;

Fig. 2 is a bottom plan view of Fig. 1;

Fig. 3 is a section view of Fig. 1 on line 3—3.

The duct hereof comprises identical sheet metal casing halves 20 having cooperating longitudinal edge flanges 21 joined by casing joining bolts 23 and containing bus bars 24, access to which may be obtained through holes 44 of the duct.

The branch outlet device hereof, utilized for rigidly securing the end of a branch circuit conduit 90 with respect to the duct, comprises a junction box 91 having flanges adapted to be secured to the duct by suitable ones of the bolts 23; the box 91 is provided with knockouts, selected ones of which may be knocked out to provide a hole to which the end of the conduit 90 may be secured and also a hole through which may be passed the branch circuit conductors 92, these adapted to have their ends connected to binding posts of the plug, referenced P2, which is pivotally mounted at its end, by means of hinges 93, on the support 91. It will be understood that the binding posts of the plug are connected to fuse holders at the hinged end of the plug, these being connected through elongated fuses F of the plug to other fuse holders at the free end of the plug, with the last mentioned fuse holders being connected to outwardly projecting plug prongs 94 of the plug, these prongs being disposed within shielding tubes, as indicated, and being properly proportioned and positioned to project through the duct holes 44 and to engage the bus bars 24 of the duct when so plugged through the holes.

At the free end of the plug is a handle 95 by means of which the plug may be swung into and out of the full and dotted line positions of Fig. 1.

Latches 96 latch the plug to the duct when the plug is swung into the plug-in position.

It will be understood that the fuse holders of the plug are so arranged that when the plug is plugged into the duct the fuses F are generally parallel to the run of the bus bars 24.

Now having described the construction herein disclosed, reference will be had to the claims which follow to determine the protection sought herein.

We claim:

1. A distribution system including a bus bar conduit and a branch outlet device secured thereto, the device comprising a sheet metal box-like stationary portion secured to the conduit and formed to permit the sheath of a group of branch circuit conductors to be secured thereto and to permit the branch circuit conductors to enter the stationary portion through the sheath and to leave the stationary portion for connection to plug prongs, the branch outlet device also including a plug hingedly mounted at one end on and with respect to the stationary portion and having at its free end the aforesaid plug prongs, to which the terminals of the branch conductors are connected.

2. A distribution system including a bus bar conduit and a branch outlet device secured thereto, the device comprising a sheet metal box-like stationary portion secured to the conduit and formed to permit the sheath of a group of branch circuit conductors to be secured thereto and to permit the branch circuit conductors to enter the stationary portion through the sheath and to leave the stationary portion for connection to plug prongs, the branch outlet device also including a plug hingedly mounted at one end on and with respect to the stationary portion and having at its free end the aforesaid plug prongs, to which the terminals of the branch conductors are connected, the plug having elongated fuses disposed parallel to the run of the bus bars within the conduit when the plug is in plug-in position with respect to the conduit.

3. A distribution system including a bus bar conduit and a branch outlet device secured thereto, the device comprising a sheet metal box-like stationary portion secured to the conduit and formed to permit the sheath of a group of branch circuit conductors to be secured thereto and to permit the branch circuit conductors to enter the stationary portion through the sheath and to leave the stationary portion for connection to plug prongs, the branch outlet device also including a plug hingedly mounted at one end on and with respect to the stationary portion and having at its free end the aforesaid plug prongs, to which the terminals of the branch conductors are connected, the stationary portion extending across the conduit, and the hinge line of the plug also extending across the conduit.

4. A device of the character described in claim 1, wherein the stationary portion extends across the conduit, and wherein the hinge line of the plug also extends across the conduit, and wherein the plug has elongated fuses disposed parallel to the run of the bus bars within the conduit when the plug is in plug-in position with respect to the conduit.

WILLIAM H. FRANK.
JOSEPH W. HARPER.